US009424723B2

(12) United States Patent
Dubarry

(10) Patent No.: US 9,424,723 B2
(45) Date of Patent: Aug. 23, 2016

(54) LUGGAGE BAG COMPRISING A GEOLOCATION MODULE ASSOCIATED WITH A COMMUNICATION MODULE

(71) Applicant: Franck Albert Dubarry, Vfroz (CH)

(72) Inventor: Franck Albert Dubarry, Vfroz (CH)

( * ) Notice: Subject to any disclaimer, the term of this patent is extended or adjusted under 35 U.S.C. 154(b) by 434 days.

(21) Appl. No.: 13/826,977

(22) Filed: Mar. 14, 2013

(65) Prior Publication Data

US 2014/0139334 A1 May 22, 2014

Related U.S. Application Data

(60) Provisional application No. 61/757,676, filed on Jan. 28, 2013.

(30) Foreign Application Priority Data

Nov. 21, 2012 (EP) ..................................... 12193714

(51) Int. Cl.
*G08B 1/08* (2006.01)
*G08B 13/24* (2006.01)
(Continued)

(52) U.S. Cl.
CPC .............. *G08B 13/2462* (2013.01); *A45C 5/03* (2013.01); *A45C 13/18* (2013.01); *G01S 5/0018* (2013.01);
(Continued)

(58) Field of Classification Search
CPC .. A45C 13/18; A45C 15/00; A45C 2005/037; A45C 5/03; G01S 19/14; G01S 5/0018; G06K 2017/0045; G06Q 10/08; G08B 13/02; G08B 13/2462; G08B 13/1427; G08B 21/24
USPC ........ 340/5.61, 539.1, 539.13, 539.32, 568.7, 340/571, 572.1
See application file for complete search history.

(56) References Cited

U.S. PATENT DOCUMENTS 5,576,692 A * 11/1996 Tompkins et al. ............ 340/571
5,815,407 A 9/1998 Huffman et al.
(Continued)

FOREIGN PATENT DOCUMENTS

| JP | 07073386 A | 3/1995 |
|----|------------|--------|
| WO | 2008151438 A1 | 12/2008 |

(Continued)

OTHER PUBLICATIONS

Easy-2-Pick Wireless Luggage Pager System(http://www.naftaliinc. com/easy2pick/94-wireless-luggage-pager.html), 2 pages, (accessed Oct. 8, 2013).

(Continued)

*Primary Examiner* — Travis Hunnings
(74) *Attorney, Agent, or Firm* — The Webb Law Firm

(57) ABSTRACT

A luggage bag is disclosed which comprises electronic circuits comprising a geolocation module and a communication module that are designed such that an information item relating to the position of the luggage bag may be remotely accessible to a user, the communication module exhibiting a switch-off device allowing its deactivation by the user independently of the remainder of the electronic circuits. The electronic circuits comprise a detection module, designed to take measurements of at least one physical quantity and to identify conditions corresponding to the landing of an aircraft. They can also be programmed to operate in an aircraft mode in which, after deactivation of the communication module in response to an action of the user, the detection module performs measurements staggered over time, the electronic circuits being designed to automatically reactivate the communication module subsequent to the identification of conditions corresponding to the landing of an aircraft.

20 Claims, 7 Drawing Sheets

(51) Int. Cl.
    *G08B 13/02*  (2006.01)
    *A45C 13/18*  (2006.01)
    *G01S 19/14*  (2010.01)
    *G01S 5/00*   (2006.01)
    *G06Q 10/08*  (2012.01)
    *A45C 5/03*   (2006.01)
    *A45C 15/00*  (2006.01)

(52) U.S. Cl.
    CPC ............... *G01S 19/14* (2013.01); *G06Q 10/08* (2013.01); *G08B 13/02* (2013.01); *A45C 15/00* (2013.01); *A45C 2005/037* (2013.01)

(56) References Cited

U.S. PATENT DOCUMENTS

| | | | |
|---|---|---|---|
| 6,342,836 B2* | 1/2002 | Zimmerman | 340/571 |
| 7,030,760 B1 | 4/2006 | Brown | |
| 7,791,455 B1 | 9/2010 | MacLean, III et al. | |
| 7,916,025 B2* | 3/2011 | Locker et al. | 340/572.1 |
| 8,167,202 B2 | 5/2012 | Saperstein | |
| 8,253,557 B2 | 8/2012 | Ani et al. | |
| 8,299,922 B2* | 10/2012 | Ben-David | 340/568.7 |
| 2001/0052850 A1* | 12/2001 | Zimmerman | 340/572.1 |
| 2002/0017989 A1 | 2/2002 | Forster et al. | |
| 2004/0021572 A1* | 2/2004 | Schoen et al. | 340/572.1 |
| 2005/0222933 A1* | 10/2005 | Wesby | 705/36 |
| 2008/0158002 A1 | 7/2008 | Parkinson et al. | |
| 2009/0061897 A1 | 3/2009 | Hamilton et al. | |
| 2009/0315704 A1* | 12/2009 | Rosing et al. | 340/539.13 |
| 2010/0248662 A1* | 9/2010 | Sheynblat et al. | 455/127.1 |
| 2011/0241874 A1* | 10/2011 | Ghisani | 340/539.32 |
| 2013/0060514 A1* | 3/2013 | Burke | 702/141 |
| 2013/0335193 A1* | 12/2013 | Hanson et al. | 340/5.61 |
| 2014/0375422 A1* | 12/2014 | Huber et al. | 340/5.61 |

FOREIGN PATENT DOCUMENTS

| | | |
|---|---|---|
| WO | 2010111399 A1 | 9/2010 |
| WO | 2012152745 A1 | 11/2012 |

OTHER PUBLICATIONS

GPS Luggage Locator (http://www.halfbakery.com/idea/GPS_20Luggage_20Locator), 2 pages, (Apr. 15, 2006).
Trakdot Luggage, (http://www.trakdot.com/TrakDot/products.jsp), 1 page, (accessed Oct. 8, 2013).

* cited by examiner

LUGGAGE BAG COMPRISING A GEOLOCATION MODULE ASSOCIATED WITH A COMMUNICATION MODULE

TECHNICAL FIELD

The present invention relates to a luggage bag comprising an envelope, defining a loading volume and bearing electronic circuits comprising in particular a geolocation module and a communication module that are designed in such a way that an information item relating to the position of the luggage bag may be remotely accessible to a user. Furthermore, the communication module comprises a switch-off device allowing its deactivation by the user independently of the remainder of the electronic circuits.

PRIOR ART

Luggage bags bearing geolocation apparatuses have already been disclosed in the prior art. Indeed, it may be desired to track the position of a luggage bag over time for diverse reasons.

By way of example, patent application US 2008/0158002 describes the use of a geolocation apparatus, associated with a communication module, in particular to track the position of a pack intended to contain money.

Moreover, it is also known to place autonomous location apparatuses in luggage bags to track the movements thereof.

Another motivation for ensuring tracking of a luggage bag is the risk of theft or loss during journeys, in particular by aircraft.

Now, aircraft journeys pose specific constraints, in particular in terms of communication with electronic apparatuses. Indeed, electronic apparatuses, generally, must be powered down during the takeoff and during the landing of an aircraft to avoid disturbing the navigation instruments. Furthermore, apparatuses liable to emit electromagnetic waves must be powered down throughout the duration of flights.

Electronic apparatuses have thus been developed which implement a method for detecting aircraft takeoff or landing so as to automatically power down the apparatus when a takeoff or a landing is identified. Such a method makes it possible to automatically power down the apparatus when its user forgets to do so manually. An apparatus of this type is for example described in patent U.S. Pat. No. 5,815,407, which relates to an electronic book having a wireless communication module liable to disturb the navigation instruments of an aircraft.

After its automatic power-down, this electronic book must be powered up again by the user, either during the flight or after the landing of the aircraft.

In the case of a hand luggage bag, such a method is not suitable. Indeed, if the luggage bag is lost or stolen while the user has forgotten to power his geolocation apparatus up again after the landing of the aircraft, the geolocation apparatus is useless and does not allow the user to retrieve his luggage bag.

Moreover, a significant number of luggage bags transported in the holds of aircraft are lost by their owners each year. Now, the prior art solution mentioned hereinabove is quite simply insufficient, given that the user cannot access his luggage bag as soon as the aircraft has landed in order to reactivate his geolocation apparatus. Therefore, if the luggage bag is diverted during transit before takeoff or after landing, while the geolocation apparatus is powered down, the user does not have any means of locating it.

Furthermore, it will be noted that in the case of a malfunction of an electronic apparatus implementing a method for identifying an aircraft takeoff, with the aim of deactivating itself automatically, it may happen that the deactivation is not performed correctly, which could pose big safety problems, on account of the possible disturbances that could be caused to the navigation instruments by the apparatus.

DISCLOSURE OF THE INVENTION

A main aim of the present invention is to alleviate the drawbacks of the geolocation apparatuses for luggage bags known from the prior art, by proposing a luggage bag furnished with such an apparatus whose operation is more secure, while guaranteeing a high level of safety with reference to the operation of the navigation instruments of an aircraft.

For this purpose, the present invention relates more particularly to a luggage bag of the type mentioned above, characterized by the fact that the electronic circuits furthermore comprise a detection module, designed to take measurements of at least one physical quantity and to identify conditions corresponding to the landing of an aircraft on the basis of these measurements, and by the fact that the electronic circuits can be programmed, prior to transport of the luggage bag by aircraft, to operate in an aircraft mode in which, after deactivation of the communication module in response to a predefined action of the user on the electronic circuits, the detection module performs measurements staggered over time, the electronic circuits also being designed to automatically reactivate the communication module subsequent to the identification of conditions corresponding to the landing of an aircraft on the basis of these measurements.

By virtue of these characteristics, the position of the luggage bag according to the invention can be tracked in a secure manner by its owner, given that he decides the moment at which he deactivates his communication module, by action on the independent switch-off device thereof, the geolocation module remaining active, as does the detection module. The latter takes measurements to identify the landing of the aircraft and thus allow automatic reactivation of the communication module without requiring the user's intervention. Therefore, even if the luggage bag is diverted from its destination during transit, its owner will have access to an information item relating to its position.

Preferably, the electronic circuits comprise at least one input, to allow the user to transmit data to them, as well as a storage memory, intended to store information items relating in particular to the dates and times of takeoff of one or more scheduled flights. Furthermore, the user can also input the places of departure and arrival of these flights. The electronic circuits are then designed to deactivate the communication module by action on its own switch-off device at an instant t1 preceding the takeoff time of the next scheduled flight by a predefined duration Δt1.

Moreover, the detection module is advantageously designed to identify conditions corresponding to the takeoff of an aircraft, in the aircraft mode, by performing measurements staggered over time, after the instant t1. The electronic circuits are then designed to momentarily reactivate the communication module if, after a predefined duration Δt2 following the envisaged takeoff time for the next scheduled flight, no takeoff has been identified on the basis of the measurements performed by the detection module, so as to render accessible, to a remote user, an information item relating to the position of the luggage bag.

In an advantageous manner, provision may be made furthermore for the electronic circuits to be designed to momentarily reactivate the communication module periodically, after expiry of the predefined duration $\Delta t2$ and until a takeoff is identified, so as to render periodically accessible, to a remote user, an information item relating to the position of the luggage bag.

By virtue of these additional characteristics, the luggage bag according to the invention exhibits an optimal safety level. Indeed, they also make it possible to ensure tracking of the position of the luggage bag if the latter were to be diverted from its destination before the takeoff of the aircraft.

According to a preferred embodiment, the electronic circuits are furthermore designed to place the detection module in a standby mode after identification of a takeoff and until an instant t3 preceding by a predefined duration $\Delta t3$ the envisaged time, such as stored in the storage memory, for the following landing, on the basis of which the electronic circuits release the detection module from its standby mode so that the latter performs measurements making it possible to identify conditions corresponding to the landing of the aircraft.

By virtue of these additional characteristics, the autonomy of tracking of the luggage bag according to the invention can be increased, by optimizing its energy consumption.

The autonomy can further be improved if provision is made moreover for the electronic circuits to be designed to store the value of the instant t2 at which a takeoff is identified, in the storage memory, and to calculate the difference between the instant t2 and the expected value for the instant of takeoff, such as stored by a user in the storage memory, and to perform an estimation of a modified time for the landing of the aircraft, with reference to the landing time such as stored by the user in the storage memory.

Thus, the electronic circuits are advantageously designed to adapt the instant t3 of exit from the standby mode of the detection module by taking into account the estimation of a modified time for the landing of the aircraft.

Moreover, generally, the detection module is preferably furnished with at least one sensor or with a combination of sensors taken from the group comprising a pressure sensor, an accelerometer, a satellite-based position sensor, a temperature sensor.

Moreover, in an advantageous manner, the luggage bag can comprise a break-in detection system, the electronic circuits being designed in such a way that an information item relating to a break-in or attempted break-in of the luggage bag may be remotely accessible to a user, either right from the detection of the break-in or the attempted break-in if the electronic circuits are in a mode of operation other than the aircraft mode, or right from reactivation of the communication module if the break-in or the attempted break-in occurs while the electronic circuits are in aircraft mode.

Generally, the communication module is able to transmit messages via a telephone network of GSM type. In particular, it can advantageously emit a message destined for a predefined number subsequent to a break-in or attempted break-in.

Moreover, the luggage bag preferably comprises a support linked in a removable manner to the envelope and carrying the assembly of the electronic circuits as well as an electrical energy source intended to ensure the operation of the electronic circuits, the link between the support and the envelope being locked by an electronic key.

The invention also relates to a method for tracking an aircraft flight for a luggage bag of the type which has just been described, comprising in particular the steps:
a) inputting data relating to at least one scheduled aircraft flight so as to store them in the storage memory,
b) deactivating the communication module, by action on its own switch-off device, prior to the scheduled flight,
c) placing the electronic circuits in an aircraft mode in which the detection module performs measurements staggered over time with the aim of identifying conditions corresponding to the landing of an aircraft on the basis of the measurements performed, and
d) automatically reactivating the communication module subsequent to the identification of conditions corresponding to the landing of an aircraft on the basis of the measurements performed.

The method according to the invention can comprise additional steps in variant embodiments.

BRIEF DESCRIPTION OF THE DRAWINGS

Other characteristics and advantages of the present invention will be more clearly apparent on reading the detailed description of a preferred embodiment which follows, given with reference to the appended drawings afforded by way of nonlimiting examples and in which.

EMBODIMENT(S) OF THE INVENTION

Figure 1:
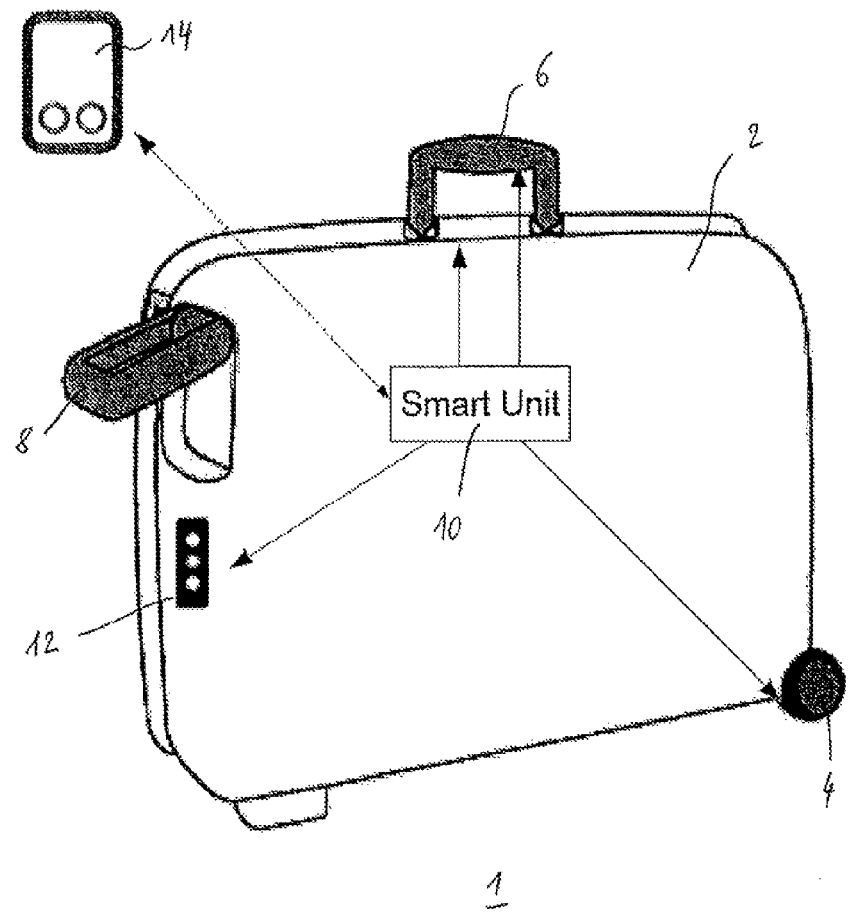
FIG. 1 represents a simplified general view of a luggage bag according to a preferred embodiment of the present invention.

FIG. 1 represents a simplified general view of a luggage bag according to a preferred embodiment of the present invention, the luggage bag exhibiting here the form of a suitcase 1, by way of nonlimiting illustration.

The suitcase 1 comprises an envelope 2 which may be flexible or, preferably, rigid. The envelope 2 defines an internal loading volume.

In an advantageous manner, the suitcase 1 is furnished with wheels 4 as well as with a first handle 6 enabling it to be carried and with a second handle 8 enabling it to be rolled along by means of its wheels. The structure illustrated and described for the suitcase 1 is of course purely illustrative and nonlimiting. The person skilled in the art will be able to produce it in any other known way suited to the implementation of the present invention.

Moreover, the suitcase 1 comprises electronic circuits intended to ensure several functions which will be described further on. In an advantageous manner, the assembly of these circuits is grouped together on a support which will be called a Smart Unit 10 hereinafter in the text.

Figure 2:
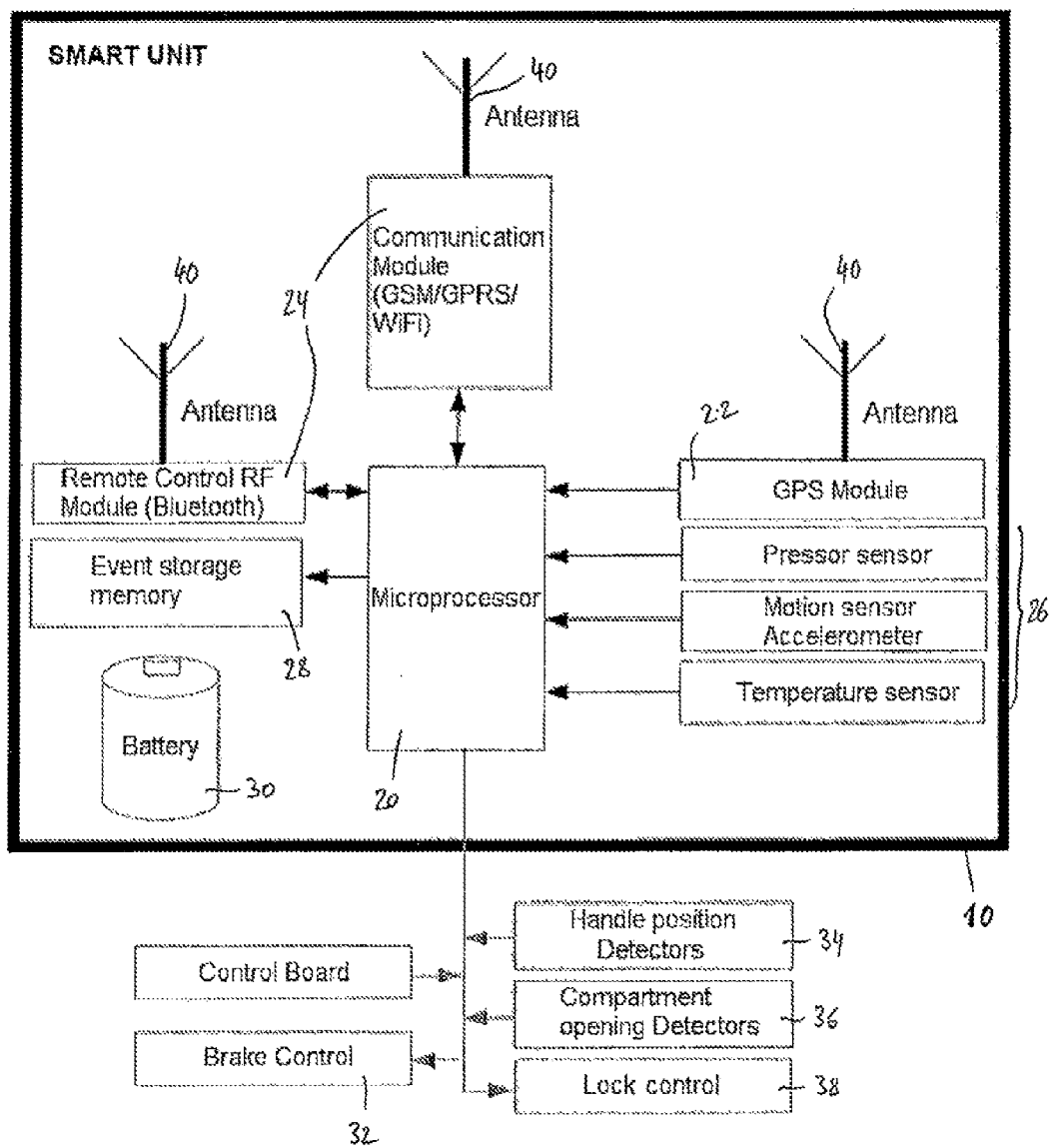
FIG. 2 represents a chart illustrating the structure of a construction detail of the luggage bag according to a preferred embodiment of the present invention.

FIG. 2 represents a chart illustrating the structure of the Smart Unit 10 according to a preferred embodiment of the present invention.

The Smart Unit 10 is preferably integrated into the envelope 2 in a removable manner, by being locked by means of a mechanical, or preferably electronic, key. Thus, only the owner of the suitcase 1 can extract the Smart Unit 10 from the envelope 2, in particular if he uses the suitcase 1 as hand luggage bag and if he has to pass through an airport security gantry. He can then remove it from the envelope so as to pass it through the X-ray scanner in a tray, in the manner of a laptop computer.

The Smart Unit 10 advantageously comprises an assembly of electronic circuits, managed by a microprocessor 20 and comprising in particular a geolocation module 22, a communication module 24, a detection module 26 and a storage memory 28 whose operation will be detailed further on, as well as a battery 30, intended to power the assembly of the electronic circuits and a monitor panel (numerical reference 12 in FIG. 1).

Furthermore, in accordance with a preferred variant embodiment of the suitcase 1, the latter can be furnished with brakes 32 acting on the wheels 4, with position detectors 34 for the handles, with detectors 36 of opening of the compartments of the suitcase, and with monitors 38 for the locks, all these elements being connected to the microprocessor 20. The latter elements together define a module for detecting a break-in or an attempted break-in.

Moreover, antennas 40 are envisaged to ensure wireless transmission between the various communicating modules of the Smart Unit 10 and remote senders or receivers.

The geolocation module 22 can be of any known type, for example it can comprise a receiver of GPS type, and the person skilled in the art will not encounter any particular difficulty in choosing one from among the models available on the market as a function of his needs. Preferably, the geolocation module 22 makes it possible to measure the geographical coordinates as well as the speed and the altitude.

The communication module 24 preferably comprises, but in a nonlimiting manner, an RF (radiofrequency) transmission module of GSM/GPRS type, that is to say it is capable of exchanging data via the standard telephone network. Of course, a transmission module for the Iridium network, for example, is conceivable but less advantageous from the point of view of communication costs.

The communication module 24 allows the microprocessor 20 to send data to a remote server and/or to a telephone of the owner of the suitcase 1, for example by sending SMSs ("Short Message Service"). It also allows the microprocessor to receive notifications and/or commands by way of SMS or of voice messages.

Furthermore, the communication module can also connect to a remote centralized server so as to undertake the exchange of information items in the form of data.

It will be noted that the commands can be location requests or other types of commands making it possible for example to monitor the luggage bag, such as the freeing up of one or more compartments, the changing of access codes or any other command affecting the mode of operation of the luggage bag.

In an advantageous manner, the communication module also comprises circuits making it possible to exchange data at short range, by way of the Wi-Fi and/or Bluetooth standards.

These processors allow the luggage bag to exchange information items with an optional remote control (numerical reference 14 in FIG. 1) or else with a telephone compatible with the Wi-Fi and/or Bluetooth standards, or indeed with a computer.

By virtue of these characteristics, it is possible for the user to input data to be stored in memory or else to monitor in particular the openings of his suitcase or the codes making it possible to lock them.

The monitor panel 12 and the communication module 24 define inputs making it possible to transmit information items or commands to the microprocessor 20.

In particular, it is possible for the owner of the suitcase 1 to transmit to the microprocessor 20 information items relating in particular to the dates and times of takeoff of one or more scheduled flights, these information items then being stored in the storage memory 28. The envisaged times for the corresponding landings can also be stored in the storage memory 28.

The detection module 26 comprises at least one sensor, preferably an assembly of sensors, for measuring the pressure, the temperature and the acceleration.

For reasons of optimizing energy consumption, the microprocessor can activate or deactivate each of the sensors individually, as a function of configuration parameters (at the user's request or as a function of predefined modes of operation of the electronic circuits).

It will be noted at this juncture that the environmental sensors of the detection module 26, the geolocation module 22 and the microprocessor 20 do not produce any emission liable to disturb the navigation instruments of an aircraft. Only the emission functions of the communication module 24, including short-range, have to be deactivated during an aircraft flight since they are liable to disturb the navigation instruments. Therefore, the present invention makes provision to furnish the communication module 24 with its own switch-off device. Thus, the communication module alone can be deactivated while the other electronic circuits remain operational, in an aircraft mode.

Figure 3:
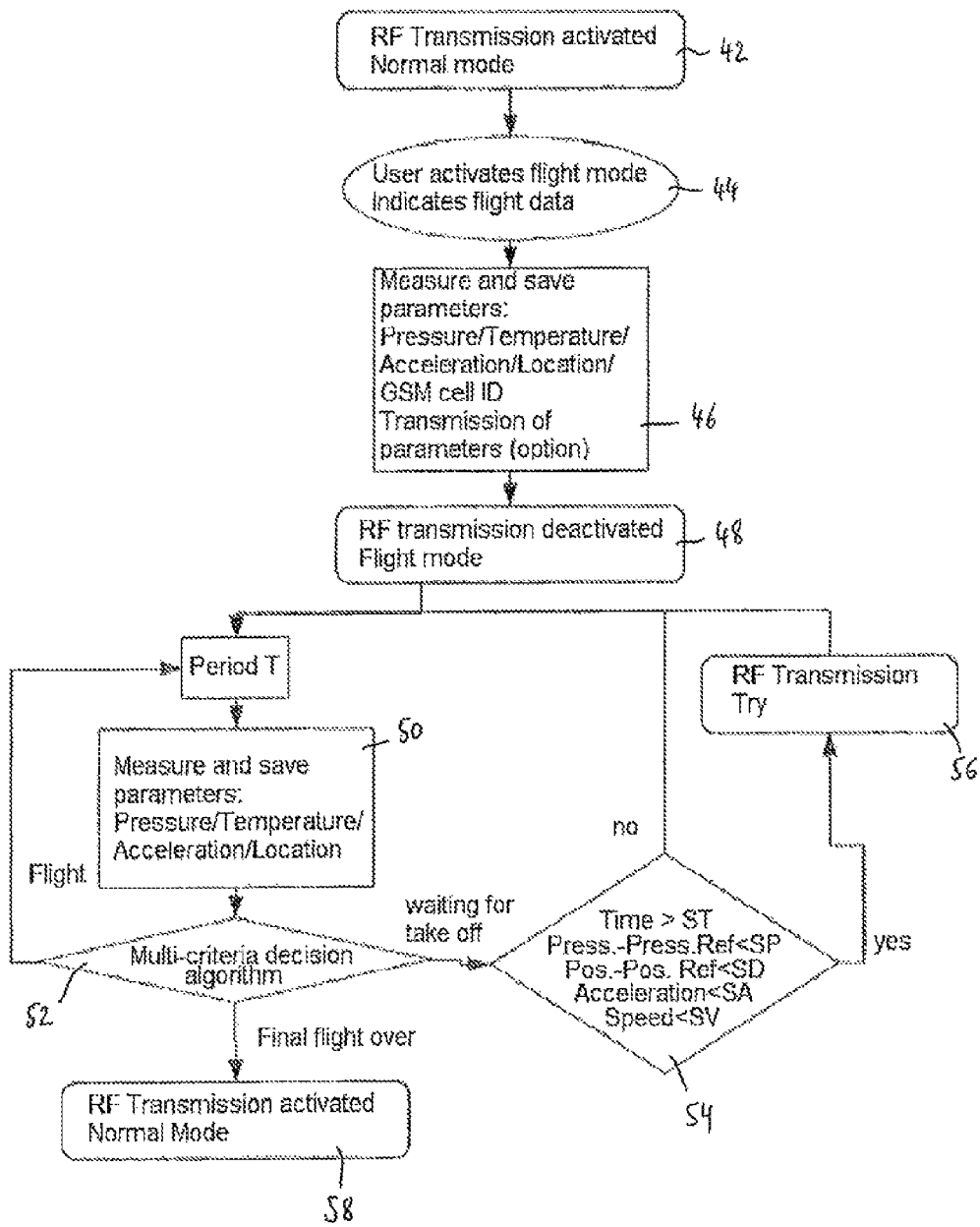
FIG. 3 represents a block diagram illustrating a first aspect of the operation of the luggage bag according to a preferred embodiment of the present invention.

FIG. 3 represents a block diagram illustrating the operation of the electronic circuits according to a preferred embodiment of the present invention, in particular how the operation of the communication module is managed as a function of the parameters relating to an aircraft flight.

The first block 42 corresponds to the operation of the electronic circuits in a normal mode, that is to say with the communication module 24 activated.

An information item relating to the position of the suitcase 1, in particular, is accessible remotely to its owner, either by being transmitted periodically to a central server, or in response to a request addressed to the microprocessor by the owner, from a telephone or a computer.

Moreover, in the block 44, the owner of the suitcase 1 can input information items relating to one or more scheduled aircraft flights, including information items relating to possible stopovers, which it will then be possible to consider to be several successive flights for the needs of the algorithm implemented in the operation of the electronic circuits. Provision may be made for this inputting to be carried out by way of the monitor panel 12 assuming that the latter possesses suitable input means (buttons and/or touchscreen), but it can be carried out, supplementarily or alternatively, from a telephone or a computer connected to the suitcase either by the telephone network, or by short-range wireless connections, that is to say WiFi or Bluetooth.

Shortly before the envisaged time for the next scheduled flight, at an instant t1 preceding the envisaged time for the takeoff of the next scheduled flight by a predefined duration Δt1, for example an hour, the values of various environmental quantities, namely the pressure, the temperature, the acceleration, the position and the identification of the GSM cell, are measured by the detection module 26, in the block 46, before being recorded in the guise of reference values in the storage memory 28.

These reference values can optionally be transmitted to a remote central server, in accordance with configuration of the global system.

The microprocessor then instructs the switch-off device belonging to the communication module 24 so as to deactivate the latter, in the block 48, thus deactivating all the transmission sources, this amounting to placing the electronic circuits in the aircraft mode.

After the instant t1, optionally subsequent to a certain predefined lag T, time-staggered measurements of the environmental parameters are performed by the detection module 26, preferably periodically, in the block 50.

Alternatively, provision may also be made for the electronic circuits to be placed in aircraft mode directly by the user, for example when he finishes inputting the scheduled flights or else subsequently, by an action on the monitor panel 12 or indeed by transmitting a suitable command via the communication module 24.

A multicriterion decision algorithm 52, composed of several combined algorithms, each of which is applied to one of the physical quantities forming the subject of measurements, is applied to the results of these measurements to identify a takeoff of the aircraft. These various algorithms will be set forth in greater detail in conjunction with the detailed description of the following figures.

The measurements performed are compared with the reference measurements stored in the memory 28. Threshold values of variation of the physical quantities measured are also stored in the memory 28, so as to define criteria making it possible to identify a takeoff or a landing.

If after a predefined duration Δt2, none of the measured physical quantities has undergone a variation greater than the corresponding threshold value, in accordance with the indications of the block 54, the microprocessor 20 momentarily reactivates the communication module 24 so as to transmit at least the position of the luggage bag to a remote server or to the telephone of the owner of the luggage bag, before deactivating it again, as illustrated in the block 56.

This operation is repeated periodically for as long as a takeoff is not identified on the basis of the measurements performed by the detection module 26.

If at least one of the physical quantities measured exhibits a variation greater than the corresponding threshold value, the detection module continues its periodic measurements to confirm the identification of a takeoff, without the communication module 24 being reactivated.

Once takeoff has been identified, the detection module 26 continues to take periodic measurements during the flight to identify the landing of the aircraft (block 50). According to a preferred alternative embodiment, the detection module 26 is placed on standby during the largest part of the flight so as to optimize the autonomy of the battery 30. The microprocessor preferably reactivates the detection module 26 so that the latter resumes its periodic measurements at an instant t3, preceding by a predefined duration Δt3 the envisaged time for the following landing such as stored in the storage memory 28.

Provision may be made for the electronic circuits to apply a correction factor to the value of the instant t3 to estimate a modified value thereof as a function of the instant t2 at which takeoff actually takes place, when the instant t2 is very far from the expected value, such as stored in the storage memory 28. The person skilled in the art will not encounter any particular difficulty in defining an algorithm for correcting this value t3 as a function of his own needs.

When landing is identified, on the basis of a multicriterion decision algorithm similar to that implemented to identify takeoff, the microprocessor 20 reactivates the communication module 24, the electronic circuits thus exiting the aircraft mode to resume a normal mode of operation, such as described above and illustrated in the block 58.

Various types of algorithms able to allow the identification of an aircraft takeoff or landing will now be described, in a nonlimiting illustrative manner.

Figure 4:
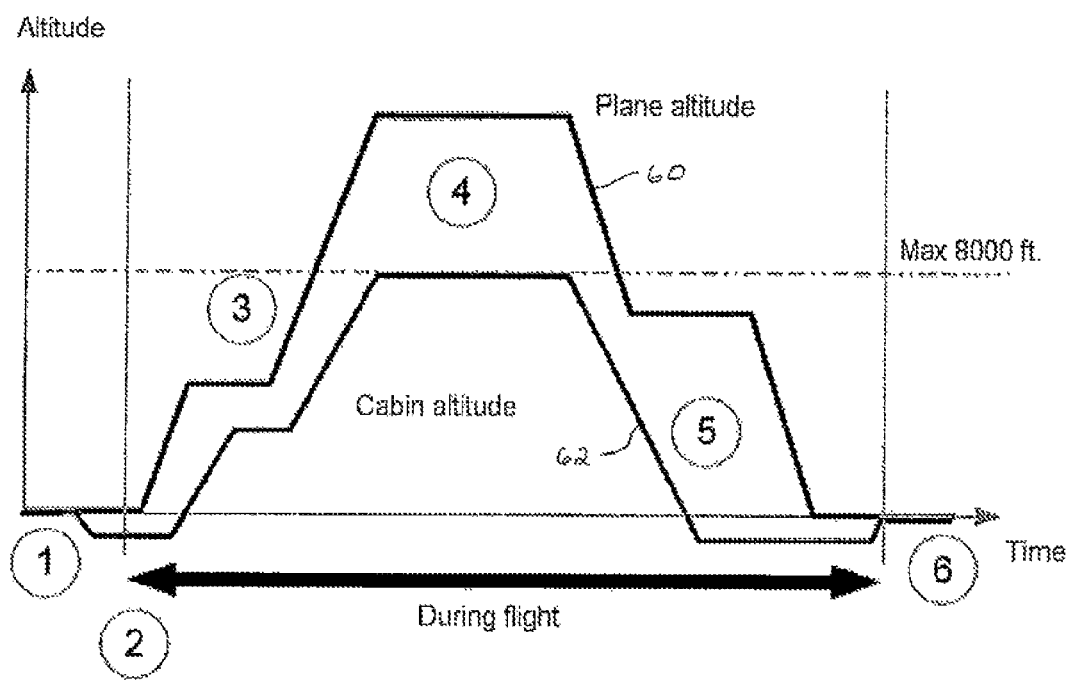
FIG. 4 represents a chart illustrating the behaviour of the pressure prevailing in the cabin of an aircraft throughout a flight and as a function of the aircraft's flight phases.

FIG. 4 represents a schematic chart illustrating the behaviour of the pressure prevailing in the cabin of an aircraft throughout a flight and as a function of the flight altitude of the aircraft. The pressure is expressed in terms of altitude equivalent in FIG. 4 to facilitate understanding.

During a flight, the cabin of an aircraft and its holds are pressurized so as to guarantee passenger comfort.

The altitude at which an aircraft flies is illustrated by the curve 60 in FIG. 4.

The curve 60 exhibits six successive portions tagged by the encircled digits ranging from 1 to 6, and corresponding to the following situations:

1/the aircraft is on the ground;
2/the aircraft is still on the ground and then takes off;
3/the aircraft is in the ascent phase;
4/the aircraft is at its cruising altitude;
5/the aircraft is in the descent phase, and
6/the aircraft is on the ground.

The curve 62 illustrates in a schematic manner the corresponding behaviour of the pressure in the cabin and the holds of the aircraft during the six phases which have just been enumerated.

Before takeoff, the internal pressure is equal to the pressure on the ground.

Shortly before takeoff, the cabin pressure is raised slightly. This increase in cabin pressure is illustrated by portion 2 of curve 62 as a decrease in altitude.

During the aircraft's ascent phase, the pressure decreases regularly but rapidly in the cabin, stepwise, until it reaches a cruising pressure. This pressure decrease is illustrated by portion 4 of curve 62 by an increase in altitude. At the cruising altitude of the aircraft, the internal pressure remains constant, while remaining greater than a minimum threshold corresponding to an altitude of the order of 2400 meters.

During the aircraft's descent, the internal pressure increases regularly but rapidly until it reaches a level slightly greater than that of the pressure on the ground. This pressure increase and greater level are illustrated by portion 5 of curve 60 by a decrease in altitude.

After landing, the internal and external pressures are equalized.

On the basis of these explanations, it is possible to define an algorithm for identifying a takeoff and/or a landing of an aircraft, on the basis of results of measurements of the pressure in the cabin or in the holds of the aircraft.

Figure 5:
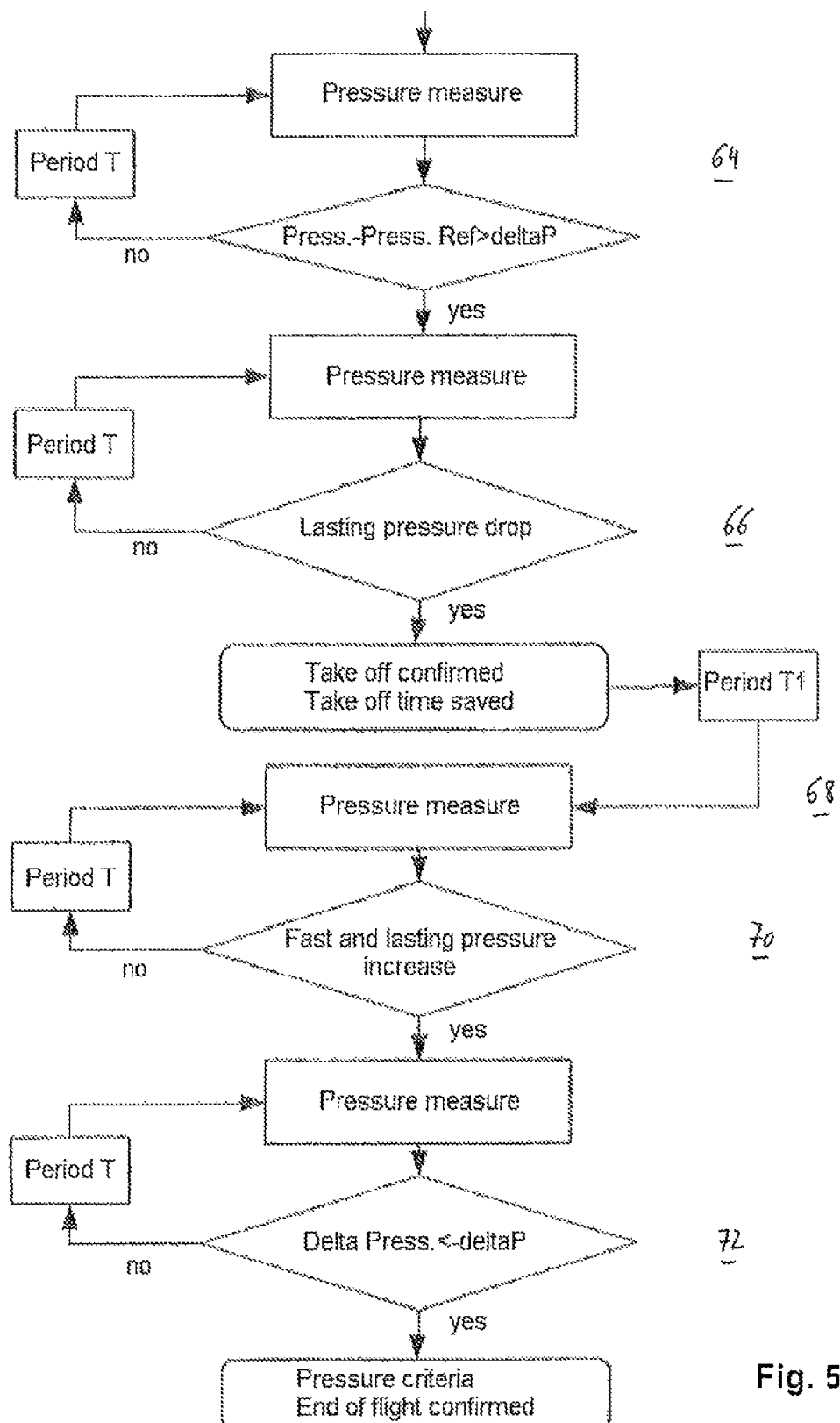
FIG. 5 represents a block diagram illustrating a second aspect of the operation of the luggage bag according to a preferred embodiment of the present invention.

An example of such an algorithm is schematically illustrated in FIG. 5, in the form of a block diagram, in a nonlimiting manner.

As mentioned above, shortly before the envisaged time for the next takeoff, the detection module 26 begins to perform periodic measurements of various physical quantities, in particular the pressure.

FIG. 5 illustrates, at 64, the fact that the detection module 26 performs a first loop of periodic measurements as long as the pressure does not decrease beyond a certain predefined threshold.

When a fast and prolonged decrease in the pressure is measured, at 66, the characteristics of a takeoff are identified and takeoff is confirmed. The time of takeoff is furthermore stored in the storage memory 28.

The detection module is thereafter advantageously placed in a standby mode in which it takes measurements with a reduced period, or indeed in which it no longer takes measurements. It is reactivated, at 68, to take measurements at a higher period after a lag T1, corresponding to an instant t3 preceding by a predefined duration Δt3 the envisaged time for the following landing, with the aim of identifying the conditions corresponding to the landing.

After having identified a phase of increase in pressure due to the descent, at 70, the detection module 26 examines whether said pressure rises slightly thereafter, at 72, so as to validate the identification of the landing, in accordance with portion 6 of the curve 62 in FIG. 4.

The landing of an aircraft can consequently be identified by virtue of an algorithm of this type, based on pressure measurements.

Figure 6:
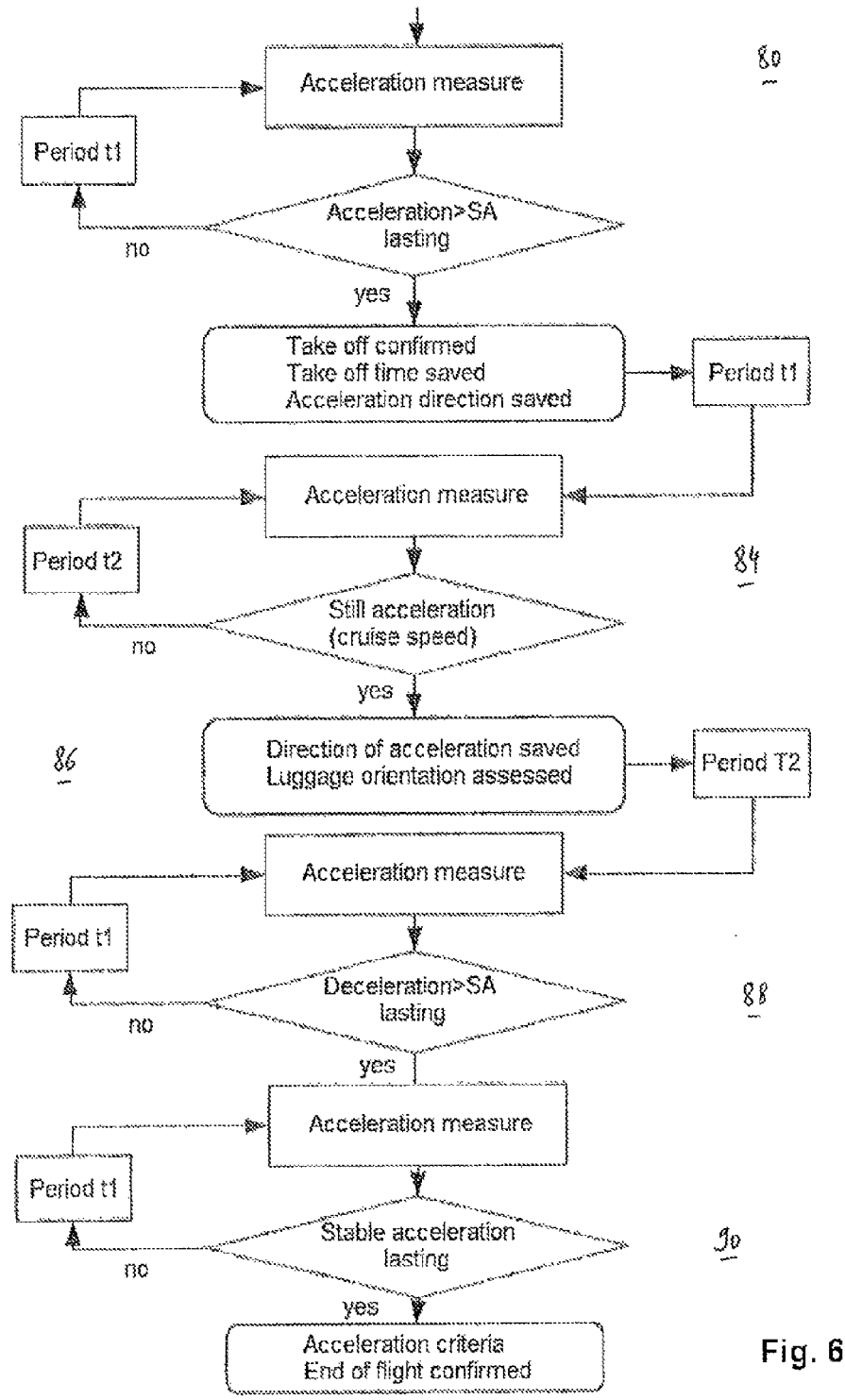
FIG. 6 represents a block diagram illustrating a third aspect of the operation of the luggage bag according to a preferred embodiment of the present invention.

FIG. 6 illustrates, in block diagram form, the implementation of an algorithm based on measurements of accelerations, as an alternative or, preferably as a supplement, to the algorithm which has just been described.

The takeoff of an aircraft is characterized by a horizontal acceleration combined with a vertical acceleration. These accelerations are maintained until the aircraft reaches its cruising speed.

Before takeoff, when the luggage bag is stored in the hold or the cabin, its acceleration is zero for a certain time, thereby making it possible to calibrate the accelerometer on its three measurement axes.

In the takeoff search phase, the detection module 26 measures the acceleration periodically, at 80.

During rollout of the aircraft, the measured acceleration is variable with vibrations due to the movements of the craft and to the vibrations of the engines.

During takeoff, the acceleration is high and makes it possible to determine the orientation of the luggage bag with respect to the front and to the rear of the aircraft. When this high acceleration is detected for a certain duration (characteristic of the takeoff acceleration of an aircraft), takeoff is confirmed, at 82.

The time of takeoff is determined and recorded in the storage memory 28. A probable arrival time is estimated as a function of the actual takeoff time, and of the takeoff and landing times such as input by the user into the storage memory 28 before the flight. This estimated arrival time is compared with other arrival time values estimated on the basis of the measurements performed by the other sensors of the detection module 26.

A few values of the acceleration may optionally be measured during the flight, at 84, to verify that the aircraft is still at constant cruising speed and to confirm the orientation of the luggage bag, at 86. Preferably, the accelerometer can be placed in standby mode for the remainder of the flight, substantially until the instant t3 defined above, at which instant it is reactivated to detect the landing of the aircraft.

During the descent phase, a deceleration with vertical and horizontal components is detected, at 88.

Upon arrival at the unloading point, the acceleration is stabilized and then becomes zero, at 90, while awaiting unloading. The microprocessor can then validate the identification of the landing on the basis of the acceleration measurements performed by the detection module 26.

Figure 7:
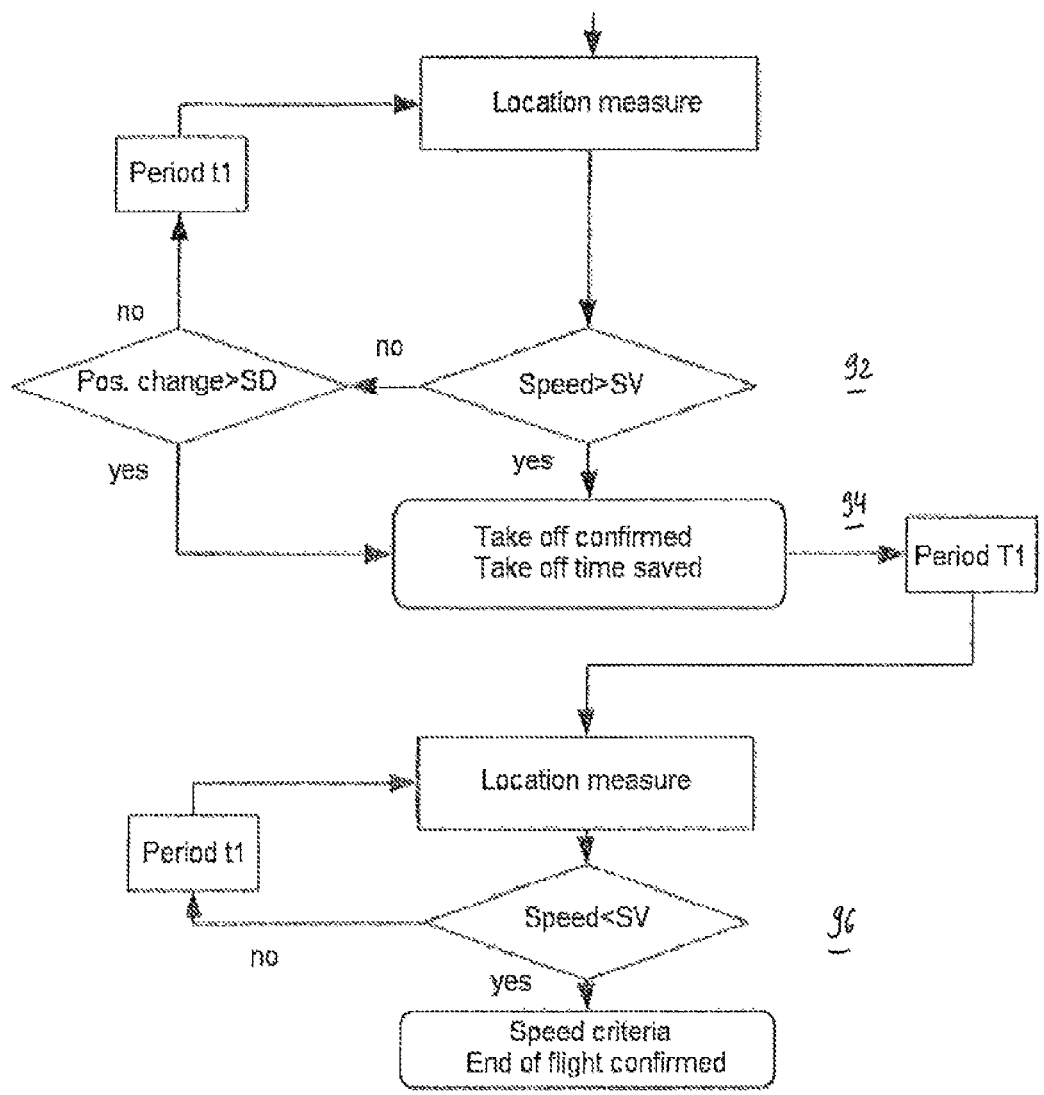
FIG. 7 represents a block diagram illustrating a fourth aspect of the operation of the luggage bag according to a preferred embodiment of the present invention.

FIG. 7 illustrates, in block diagram form, the implementation of a third algorithm based on position measurements by geolocation receiver of GPS type, as an alternative or, preferably as a supplement, to the algorithms already described. The speed can also be determined on the basis of the position measurements.

In contradistinction to the other physical quantities, the position measured by GPS may not be determined if the satellite signals reception conditions are not adequate. Hence, in the case of poor reception, the implementation of this additional algorithm may not be performed.

Before the flight, the user inputs the path of the flight that he is planning, thereby making it possible to determine the location of the departure point of the flight.

Slightly before takeoff, the microprocessor determines the speed of the luggage bag by virtue of the position measurements, at 92. Indeed, the takeoff of the aircraft is characterized by a high speed and the determination of such a speed makes it possible to identify the instant of takeoff. The actual time of takeoff is recorded in the storage memory 28, at 94, and an arrival time is estimated, as described above.

If the information item relating to the speed is not available before takeoff or during the flight, a subsequent information item relating to location makes it possible, as soon as it is available, to calculate a distance with reference to the departure point and may optionally suffice to confirm that takeoff has indeed occurred. The arrival time can also be estimated on the basis of this measurement.

The subsequent detection of a value of the speed of less than a certain predefined threshold, at 96, makes it possible at any moment to confirm that landing has indeed occurred.

Comparison of the position of the luggage bag after landing with the expected position such as stored in memory makes it possible to verify that the luggage bag is indeed situated at the place envisaged and, if appropriate, to generate an alert for the attention of the owner if such is not the case. Once landing has been identified, the microprocessor reactivates the communication module 24 and the alert can be transmitted to a remote central server and/or to the telephone of the owner of the luggage bag.

Thus, the combination of the measurements performed by the various types of sensors of the detection module 26 makes it possible to confirm the various stages of the journey by independent schemes and guarantees great reliability of the tracking of the luggage bag according to the present invention. Furthermore, the joint use of these distinct criteria makes it possible to guarantee that exit from the aircraft mode of the communication module 24 can only happen if the luggage bag is actually on the ground and there is no risk of disturbing the navigation instruments of the aircraft.

In a similar manner, if a break-in or an attempted break-in is detected by one of the detectors 36 or 38 while the electronic circuits are in aircraft mode, an alert is generated but is not sent to a remote central server or to the owner of the luggage bag until after reactivation of the communication module 24.

The preceding description endeavours to describe a particular embodiment by way of nonlimiting illustration and the invention is not limited to the implementation of certain particular characteristics which have just been described, such as for example the form and the structure of the luggage bag such as is illustrated and described or else the aspects of its configuration which relate to elements not having any direct impact on the method for locating the luggage bag and the management of the aircraft mode.

The person skilled in the art will not encounter any particular difficulty in adapting the content of the present disclosure to his own needs and implementing a luggage bag which only partly meets the characteristics mentioned in the present patent application, having a geolocation module associated with a communication module, the latter being placed in aircraft mode before the takeoff of an aircraft, independently of the other electronic circuits and on the basis of user input, and then reactivated after identification of the landing of the aircraft, on the basis of measurements performed by a detection module.

What is claimed is:

1. A luggage bag comprising an envelope, defining a loading volume and bearing electronic circuits comprising in particular a geolocation module and a communication module that are designed in such a way that an information item relating to the position of the luggage bag may be remotely accessible to a user, said communication module comprising a switch-off device allowing its deactivation by the user independently of the remainder of said electronic circuits, wherein
said electronic circuits furthermore comprise a detection module, designed to take measurements of at least one physical quantity and to identify conditions corresponding to the landing of an aircraft on the basis of the measurements,
said electronic circuits are capable of functioning in an aircraft mode, which mode can exclusively be activated:
in response to a suitable action of the user on said electronic circuits, or
as a result of a suitable programming of said electronic circuits by the user prior to transport of the luggage bag by aircraft, based on at least one expected takeoff time,
said electronic circuits being designed to deactivate said communication module in said aircraft mode and to control said detection module so that it performs the measurements staggered over time, said electronic circuits also being designed to automatically reactivate said communication module subsequent to the identification of conditions corresponding to the landing of an aircraft on the basis of said measurements.

2. The luggage bag of claim 1, wherein said electronic circuits comprise at least one input, to allow a user to transmit data to them, as well as a storage memory, intended to store information items relating in particular to the dates and times of takeoff of one or more scheduled flights, and said electronic circuits are designed to deactivate said communication module by action on its switch-off device at an instant t1 preceding the takeoff time of the next scheduled flight by a predefined duration $\Delta t1$.

3. The luggage bag of claim 2, wherein said detection module is also designed to identify conditions corresponding to the takeoff of an aircraft, at an instant t2, in said aircraft mode, by performing measurements staggered over time, after said instant t1, said electronic circuits being designed to momentarily reactivate said communication module if, after a predefined duration $\Delta t2$ following the envisaged takeoff time for the next scheduled flight, no takeoff has been identified on the basis of the measurements performed by said detection module, so as to render accessible, to a remote user, an information item relating to the position of the luggage bag.

4. The luggage bag of claim 3, wherein said electronic circuits are designed to momentarily reactivate said communication module periodically, after expiry of said duration $\Delta t2$ and until a takeoff is identified, so as to render periodically accessible, to a remote user, an information item relating to the position of the luggage bag.

5. The luggage bag of claim 3, wherein said storage memory is also intended to store information items relating to the dates and times of landing of one or more scheduled flights, and said electronic circuits are designed to place said detection module in a standby mode after identification of a takeoff and until an instant t3 preceding by a predefined duration $\Delta t3$ the envisaged time, such as stored in said storage memory, for the following landing, on the basis of which said electronic circuits release said detection module from its standby mode so that the latter performs measurements making it possible to identify conditions corresponding to the landing of the aircraft.

6. The luggage bag of claim 4, wherein said storage memory is also intended to store information items relating to the dates and times of landing of one or more scheduled flights, and said electronic circuits are designed to place said detection module in a standby mode after identification of a takeoff and until an instant t3 preceding by a predefined duration $\Delta t3$ the envisaged time, such as stored in said storage memory, for the following landing, on the basis of which said electronic circuits release said detection module from its standby mode so that the latter performs measurements making it possible to identify conditions corresponding to the landing of the aircraft.

7. The luggage bag of claim 3, wherein said electronic circuits are designed to store the value of the instant t2 at which a takeoff is identified, in said storage memory, and to calculate the difference between said instant t2 and the expected value such as stored by a user in said storage memory, and to perform an estimation of a modified time for the landing of the aircraft, with reference to the landing time such as stored by the user in said storage memory.

8. The luggage bag of claim 4, wherein said electronic circuits are designed to store the value of the instant t2 at which a takeoff is identified, in said storage memory, and to calculate the difference between said instant t2 and the expected value such as stored by a user in said storage memory, and to perform an estimation of a modified time for the landing of the aircraft, with reference to the landing time such as stored by the user in said storage memory.

9. The luggage bag of claim 6, wherein said electronic circuits are designed to store the value of the instant t2 at which a takeoff is identified, in said storage memory, and to calculate the difference between said instant t2 and the expected value such as stored by a user in said storage memory, and to perform an estimation of a modified time for the landing of the aircraft, with reference to the landing time such as stored by the user in said storage memory.

10. The luggage bag of claim 6, wherein said electronic circuits are designed to adapt said instant t3 of exit from the standby mode of said detection module by taking into account said estimation of a modified time for the landing of the aircraft.

11. The luggage bag of claim 10, wherein said detection module is furnished with at least one sensor or with a combination of sensors taken from the group comprising a pressure sensor, an accelerometer, a satellite-based position sensor, a temperature sensor.

12. The luggage bag of claim 1, furthermore comprising a break-in detection system, said electronic circuits being designed in such a way that an information item relating to a break-in or attempted break-in of the luggage bag may be remotely accessible to a user, either right from the detection of the break-in or the attempted break-in if said electronic circuits are in a mode of operation other than said aircraft mode, or right from reactivation of said communication module if the break-in or the attempted break-in occurs while said electronic circuits are in aircraft mode.

13. The luggage bag of claim 1, wherein said communication module is able to transmit messages via a telephone network of GSM type.

14. The luggage bag of claim 12, wherein said communication module is able to transmit messages via a telephone network of GSM type, said electronic circuits further being designed so that said communication module emits a message destined for a predefined number subsequent to a break-in or attempted break-in.

15. The luggage bag of claim 1, comprising a support linked in a removable manner to the said envelope and carrying the assembly of said electronic circuits as well as an electrical energy source intended to ensure the operation of said electronic circuits, the link between said support and said envelope being locked by an electronic key.

16. The luggage bag of claim 6, comprising a support linked in a removable manner to the said envelope and carrying the assembly of said electronic circuits as well as an electrical energy source intended to ensure the operation of said electronic circuits, the link between said support and said envelope being locked by an electronic key.

17. A method for tracking an aircraft flight for a luggage bag comprising an envelope, defining a loading volume and bearing electronic circuits comprising in particular a geolocation module and a communication module that are designed in such a way that an information item relating to the position of the luggage bag may be remotely accessible to a user, said communication module exhibiting a switch-off device allowing its deactivation by the user independently of the remainder of said electronic circuits, said electronic circuits furthermore comprising a detection module, designed to take measurements of at least one physical quantity and to identify conditions corresponding to the landing of an aircraft on the basis of these measurements, as well as at least one input, to allow a user to transmit data to them, and a storage memory, intended to store information items relating in particular to the dates and times of takeoff of one or more scheduled flights, the method comprising the steps:

a) deactivating said communication module, by action on said switch-off device, prior to a scheduled flight, b) placing said electronic circuits in an aircraft mode in which said detection module performs measurements staggered over time with the aim of identifying conditions corresponding to the landing of an aircraft on the basis of said measurements, wherein the aircraft mode is exclusively activated:
  in response to a suitable action of the user on said electronic circuits, or
  as a result of a suitable programming of said electronic circuits by the user prior to transport of the luggage bag by aircraft, based on at least one expected takeoff time, and c) automatically reactivating said communication module subsequent to the identification of conditions corresponding to the landing of an aircraft on the basis of said measurements.

18. The method of claim 17, wherein said detection module also being designed to identify conditions corresponding to the takeoff of an aircraft in said aircraft mode, the method further comprising: performing measurements staggered over time, on the basis of an instant t1 preceding the takeoff time of the next scheduled flight by a predefined duration $\Delta t1$, so as to determine the instant t2 of the actual takeoff.

19. The method of claim 17, further comprising;
momentarily reactivating said communication module periodically, after expiry of said duration $\Delta t2$ and until a takeoff is identified, so as to render periodically accessible, to a remote user, an information item relating to the position of the luggage bag.

20. The method of claim 18, further comprising;
momentarily reactivating said communication module periodically, after expiry of said duration $\Delta t2$ and until a takeoff is identified, so as to render periodically accessible, to a remote user, an information item relating to the position of the luggage bag.

* * * * *